United States Patent
Crespy et al.

(10) Patent No.: US 10,854,896 B2
(45) Date of Patent: Dec. 1, 2020

(54) COOLANT PURIFICATION

(71) Applicant: Intelligent Energy Limited, Loughborough (GB)

(72) Inventors: Mathias Crespy, Loughborough (GB); Pratap Rama, Loughborough (GB); Daniel Ninan, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 281 days.

(21) Appl. No.: 14/898,092

(22) PCT Filed: Jun. 25, 2014

(86) PCT No.: PCT/GB2014/051943
§ 371 (c)(1),
(2) Date: Dec. 11, 2015

(87) PCT Pub. No.: WO2014/207463
PCT Pub. Date: Dec. 31, 2014

(65) Prior Publication Data
US 2016/0141648 A1    May 19, 2016

(30) Foreign Application Priority Data

Jun. 28, 2013 (GB) .................................. 1311603.3

(51) Int. Cl.
*H01M 8/04044* (2016.01)
*H01M 8/04029* (2016.01)
(Continued)

(52) U.S. Cl.
CPC ... *H01M 8/04044* (2013.01); *H01M 8/04029* (2013.01); *H01M 8/04067* (2013.01);
(Continued)

(58) Field of Classification Search
CPC ......... H01M 8/04044; H01M 8/04358; H01M 8/04417; H01M 8/04768; H01M 8/04067;
(Continued)

(56) References Cited

U.S. PATENT DOCUMENTS

2002/0132143 A1    9/2002  Itou et al.
2005/0136306 A1    6/2005  Sugiura et al.
(Continued)

FOREIGN PATENT DOCUMENTS

CA    2840752 A1    1/2013
CN    1638178 A     7/2005
(Continued)

OTHER PUBLICATIONS

Bixler et al.; "Biofouling: Lessons From Nature"; Philosophical Transactions The Royal Society A; vol. 370 Issue 1967; Apr. 2012; p. 2381-2417.
(Continued)

*Primary Examiner* — Ula C Ruddock
*Assistant Examiner* — Eugenia Wang
(74) *Attorney, Agent, or Firm* — BakerHostetler (57) ABSTRACT

A fuel cell system comprises an antimicrobial patterned surface. The fuel cell system may comprise a fuel cell stack, a coolant reservoir, and a coolant flow path configured to supply coolant from the coolant reservoir to the fuel cell stack. One or more of the fuel cell stack, the coolant reservoir and the coolant flow path may comprise the antimicrobial patterned surface.

14 Claims, 5 Drawing Sheets

(51) Int. Cl.
*H01M 8/04007* (2016.01)
*H01M 8/0432* (2016.01)
*H01M 8/0438* (2016.01)
*H01M 8/04746* (2016.01)

(52) U.S. Cl.
CPC ... *H01M 8/04358* (2013.01); *H01M 8/04417* (2013.01); *H01M 8/04768* (2013.01); *H01M 2250/20* (2013.01); *Y02T 90/40* (2013.01)

(58) Field of Classification Search
CPC .......... H01M 8/04029; H01M 2250/20; Y02T 90/32
See application file for complete search history.

(56) References Cited

U.S. PATENT DOCUMENTS

| | | | |
|---|---|---|---|
| 2005/0178286 | A1 | 8/2005 | Bohn, Jr. et al. |
| 2007/0110824 | A1* | 5/2007 | Nageswaran ........ A01N 59/26 424/604 |
| 2007/0227428 | A1* | 10/2007 | Brennan ................ B08B 17/06 114/67 R |
| 2008/0118793 | A1 | 5/2008 | Chapman et al. |
| 2008/0206622 | A1* | 8/2008 | Mitsuta .............. H01M 8/0276 429/448 |
| 2010/0068236 | A1* | 3/2010 | Peitz .................... A01N 25/34 424/405 |
| 2010/0330340 | A1 | 12/2010 | Rothstein et al. |
| 2011/0142899 | A1* | 6/2011 | Lagaron Abello ..... B82Y 30/00 424/405 |
| 2012/0058302 | A1 | 3/2012 | Eggenspieler et al. |
| 2012/0064417 | A1* | 3/2012 | Oe .................... H01M 8/04141 429/410 |

FOREIGN PATENT DOCUMENTS

| | | |
|---|---|---|
| DE | 102008054370 A1 | 6/2010 |
| EP | 1465281 A2 | 10/2004 |
| JP | H11-348088 A | 12/1999 |
| JP | 2004-165121 A | 6/2004 |
| JP | 2005-069190 A | 3/2005 |
| JP | 2005-332746 A | 12/2005 |
| JP | 2005-339889 A | 12/2005 |
| JP | 2007-529090 A | 10/2007 |
| JP | 2007-287591 A | 11/2007 |
| JP | 2009-224121 A | 10/2009 |
| JP | 2013-517903 A | 5/2013 |
| WO | WO 2006/071580 A2 | 7/2006 |
| WO | WO 2011/094344 A1 | 8/2011 |
| WO | WO 2013/002039 A1 | 1/2013 |
| WO | WO 2013/063520 A1 | 5/2013 |

OTHER PUBLICATIONS

Kirschner et al.; Bio-Inspired Antifouling Strategies; Annual Review of Materials Research; vol. 42; May 2012; p. 211-229.
International Patent Application No. PCT/GB2014/051943; Int'l Written Opinion and Search Report; dated Oct. 29, 2014; 9 pages.
http://sharklet.com/wp-content/uploads/2011/12/Sharket-Company-Overview-AUGUST-2011.pd; Sharklet Technologies, Inc.; Aug. 2011; 2 pages.
"Surface Protection"; http://www.sharklet.com/sharklet-products/sharklet-safetouch-for . . . ; Sharkle Technologies, Inc; ©2010; accessed May 17, 2013; 2 pages.
"Sharklet"; http://www.sharklet.com/about-us/faqs/; Sharklet Technologies, Inc.; ©2010; accessed May 17, 2013; 2 pages.
"LGInternational to Debut Line of Tactivex™ Surface Protection Products for Healthcare at ICAAC in Chicago"; http://www.prweb.com/releases/2011/9/prweb8798752.htm; PRWEB; Sep. 15, 2011; accessed Mar. 7, 2016; 4 pages.
Great Britain Patent Application No. 1311603.3; Search Report; dated Dec. 17, 2013; 4 pages.
European Patent Application No. 19154178.8; Extended Search Report; dated Mar. 22, 2019; 7 pages.

* cited by examiner

COOLANT PURIFICATION

CROSS-REFERENCE TO RELATED APPLICATIONS

This application is a National Stage of International Patent Application No. PCT/GB2014/051943, filed Jun. 25, 2014 and claims priority to foreign application GB 1311603.3, filed Jun. 28, 2013, the contents of which are incorporated herein by reference in their entirety.

The present invention relates to electrochemical fuel cells disposed in a stack formation, and in particular to cooling systems for such fuel cell stacks. In particular, the invention relates to a fuel cell system, an antimicrobial system for a fuel cell system, and a vehicle including the fuel cell system.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e., hydrogen ions) are conducted through the membrane, balanced by electrons conducted through a circuit connecting the anode and cathode of the fuel cell. To increase the available voltage, a stack is formed comprising a number of MEAs electrically arranged in series. Each MEA is provided with separate anode and cathode fluid flow paths. The anode and cathode fluid flow paths respectively deliver fuel and oxidant to the membrane. The fuel cell stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved at least in part by the delivery of coolant (such as water) to individual cells in the stack in either the anode fluid flow paths (which serves to hydrate the anode) and/or in the cathode fluid flow path which combines with reactant water. In each case, evaporative cooling of the fuel cells can occur.

In a typical arrangement, cooling water is injected into the anode or cathode fluid flow channels of the fuel cell stack. The coolant water must be very pure. If contaminated coolant water is introduced into the fuel cell stack then the contaminants can drastically affect the performance of the fuel cell stack and can degrade the components within the stack. Contaminants may be inorganic (such as metal ions) and organic (such as organic contaminant molecules and bacteria/microbes). It is therefore beneficial to treat coolant water before it enters the fuel cell stack to remove contaminants.

Ozone may be used to as a powerful disinfectant to kill bacteria/microbes in water. However, it may not always be practical to use ozone to disinfect water in stationary and confined environments such as in back-up power systems and combined-heat-and-power (CHP) systems as ozone can be harmful.

Ultra violet (UV) light may be used to kill bacteria/microbes. However, using UV light to disinfect water may not be effective in all situations. In a fuel cell system, only the process fluid (that is, the fluid exposed to the UV light) would be treated by the UV light. If UV light does not reach a region of water in a fuel cell system (such as in a water storage tank), then that unexposed water is not cleaned by the UV light. Further, if an aggregation of biological contaminants is present (such as a biofilm) then only the exposed surface would be treated by the UV light.

It is desirable to disinfect water at the source before it passes through the fuel cell system conduits, mechanisms and the fuel cell stack. Thus, disinfecting the coolant water in a water reservoir/storage tank, if used, is desirable. As mentioned above, it is not always practical to use ozone for this purpose, and UV illumination may be ineffective when used in a storage tank or similar coolant reservoir.

According to an aspect of the invention, there is provided a fuel cell system comprising an antimicrobial patterned surface. The antimicrobial patterned surface may be antibacterial, antifungal, and/or antiviral. Advantageously, the patterning of the antimicrobial surface gives rise to its antimicrobial properties, as opposed to, for example chemical additives in the surface material.

The antimicrobial patterned surface may inhibit microbial growth by interfering with the adhesion and growth/development of the microbes on the surface. The relief of the pattern may be such that microbes, such as bacteria, are unable to multiply and/or group together on the surface. This may inhibit the development and spread of biofilms over surfaces within the fuel cell system. By inhibiting microbial growth and biofilm development, coolant in the fuel cell system may be kept pure.

The fuel cell system may comprise: a fuel cell stack; a coolant reservoir; and a coolant flow path configured to supply coolant from the coolant reservoir to the fuel cell stack; wherein one or more of the fuel cell stack, the coolant reservoir and the coolant flow path comprise the antimicrobial patterned surface.

The antimicrobial patterned surface may comprise microscale corrugations or ridges (continuous or discontinuous) for inhibiting microbial growth. The microscale corrugations may each have a width of between 1 and 100 microns, 10 and 100 microns and possibly between 2 and 25 microns. The microscale corrugations may be separated across their width by a spacing of between 1 and 100 microns, 10 and 100 microns and possibly between 2 and 25 microns. The microscale corrugations may each have a depth of between 1 and 100 microns, 10 and 100 microns and possibly between 2 and 20 microns. The antimicrobial patterned surface may comprise a cellular relief pattern. This is advantageous as the repeating cells of the patterned surface provide for efficient manufacture.

The antimicrobial patterned surface may have an average roughness factor of between 2 and 30, the average roughness factor determined as the ratio of the actual surface area to the geometric surface area (in some examples the average roughness factor may be greater than 30). Advantageously, the patterned surface may be designed and manufactured with particular surface relief patterning, with the surface relief structures that form the pattern having particular microscale dimensions, in such as way as to prevent the aggregation and development/spread of microbes within the fuel cell system.

The antimicrobial patterned surface may be chemically inert. Advantageously, the surface may have antimicrobial properties due to the particular surface patterning, thus providing an antimicrobial surface without antimicrobial chemical agents. This may be desirable for maintaining a pure coolant supply to fuel cell stacks in the fuel cell system.

The antimicrobial patterned surface may be chemically antimicrobial. Advantageously, the surface may have antimicrobial properties due to the particular surface patterning as well as due to chemically active antimicrobial agents. Thus a "double action" antimicrobial surface, which may inhibit microbial growth due to the patterned surface, and which may kill existing microbes due to the chemical antimicrobial properties, may be used in a fuel cell system.

The coolant may be water, in particular purified water or deionised water.

The fuel cell system may comprise an ultra violet light source arranged in a coolant flow path for supplying coolant to a fuel cell stack, the UV light source positioned upstream of the fuel cell stack. Advantageously, using a UV light source configured to kill microbes present in the coolant flow path of the fuel cell system may allow for the provision of pure coolant to the fuel cell stack(s), and works well with the antimicrobial patterned surface which helps to reduce the build up of biofilms and the like which the UV light may not be able to penetrate.

The fuel cell system may comprise a deionisation apparatus arranged in a coolant flow path for supplying coolant to a fuel cell stack, the deionisation apparatus positioned upstream of the fuel cell stack. Advantageously, using a deionisation apparatus configured for ion exchange with the coolant in the fuel cell system may allow for the provision of pure coolant to the fuel cell stack(s), and works well with the antimicrobial patterned surface to ensure that the deionisation apparatus does not get coated in biofilms. The deionisation apparatus may be a deionisation column.

A deionisation apparatus may be positioned downstream from an ultra violet light source and upstream from a fuel cell stack in the fuel cell system. Advantageously, coolant may be cleaned using UV light to destroy microbes in the coolant, then the coolant passes through a deionisation apparatus for ion exchange, before arriving at the fuel cell stack(s).

The fuel cell system may comprise a filter arranged in a coolant flow path for supplying coolant to a fuel cell stack, the filter positioned upstream of the fuel cell stack.

The fuel cell system may comprise: a coolant flow path for transporting coolant in the fuel cell system; a pressure meter configured to determine the coolant pressure in the coolant flow path; a pump positioned in the coolant flow path; and a controller configured to control the pump; wherein the controller may be configured to receive a pressure value from the pressure meter and, based on the pressure value, control the flow of coolant in the coolant flow path using the pump. Advantageously, if the pressure falls in the coolant flow path the controller may control the pump to increase the coolant flow.

The fuel cell system may comprise: a coolant flow path for transporting coolant in the fuel cell system; a temperature meter configured to determine the coolant temperature in the coolant flow path; a pump positioned in the coolant flow path; and a controller configured to control the pump; wherein the controller may be configured to receive a temperature value from the temperature meter and, based on the temperature value, control the flow of coolant in the coolant flow path using the pump. Advantageously, if the temperature rises in the coolant flow path the controller may control the pump to increase the coolant flow.

In a further aspect of the invention there is provided a vehicle comprising a fuel cell system as disclosed herein.

In a further aspect of the invention there is provided an antimicrobial system for a fuel cell system as disclosed herein. Such a system may be, for example, a coolant reservoir for connection to a fuel cell system. The coolant reservoir may comprise an antimicrobial patterned surface.

According to another aspect, the invention provides a vehicle comprising a fuel cell system as disclosed herein.

Embodiments of the present invention will now be described by way of example and with reference to the accompanying drawings in which.

The various embodiments described below comprise a fuel cell system 100; 300; 400; 500 having a fuel cell stack 102; 302; 402; 502, a coolant reservoir 104; 304; 404; 504 and a coolant flow path 106; 306; 406; 506 for the supply of coolant from the reservoir 104; 304; 404; 504 to the fuel cell stack 102; 302; 402; 502. A patterned antimicrobial surface 108, 110, 112; 200; 308; 408; 508 is present in the fuel cell system 100; 300; 400; 500 to prevent bacterial contamination of the cooling water supply to the evaporatively cooled fuel cell stack 102; 302; 402; 502.

Fuel cell systems as described herein may be suitable for use in combined-heat-and-power (CHP) and back up supply units using evaporatively cooled fuel cells/fuel cell stacks.

The embodiments described herein comprise an antimicrobial (in particular, antibacterial) patterned surface which inhibits biofilm/microbial/bacterial growth. Thus the present invention advantageously provides improved fuel cell stack assemblies by inhibiting the growth of microbes in the coolant to be supplied for evaporative cooling of the fuel cell stack. The antimicrobial patterned surface need not be chemically active.

The patterned surface may inhibit the growth and clustering of microbes/bacteria on its surface due to having a patterned relief structure with raised features and lower regions. The size of the raised features and the spacing between the raised features may be in the micron range. The size of the raised features may be small enough to prevent microbes settling on the top of the raised features. The size of the spaces between the raised features may be small enough such that microbes are unable to settle between the raised features. Thus the surface relief interferes with the settlement and adhesion of microbes on the surface. A raised feature spacing of around 25% to 75% of the size of an organism's smallest dimension may be suitable for inhibiting bioadhesion of the microbial organism.

The following discussions use the term "coolant". The skilled person will appreciate that water, in particular purified water or deionised water, may be used as a suitable coolant, but that the embodiments need not be restricted to the use of water as a suitable coolant.

Figure 1A:
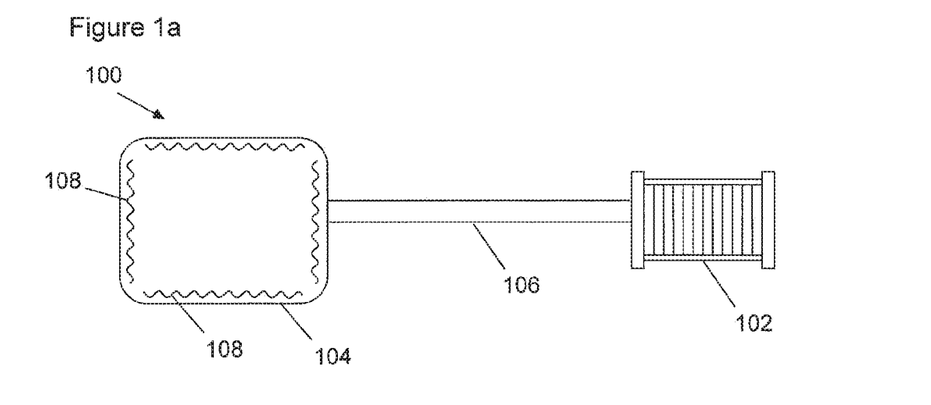
FIGS. 1a-1c show schematic views of fuel cell systems comprising an antimicrobial patterned surface.
Figure 1B:
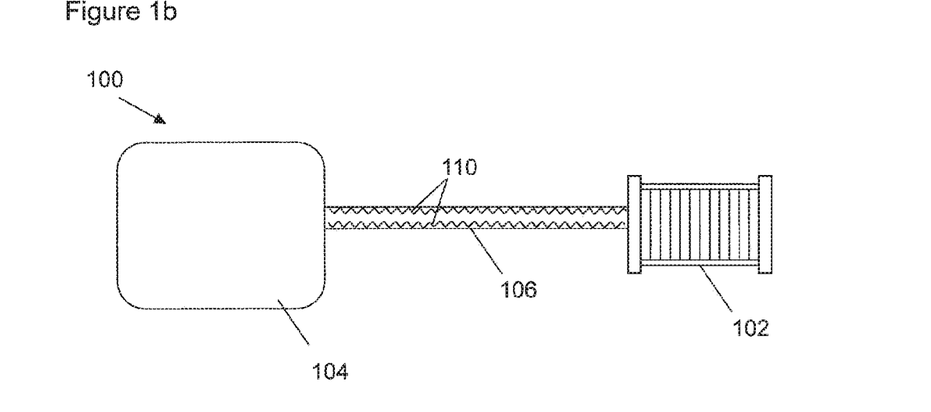
Figure 1C:
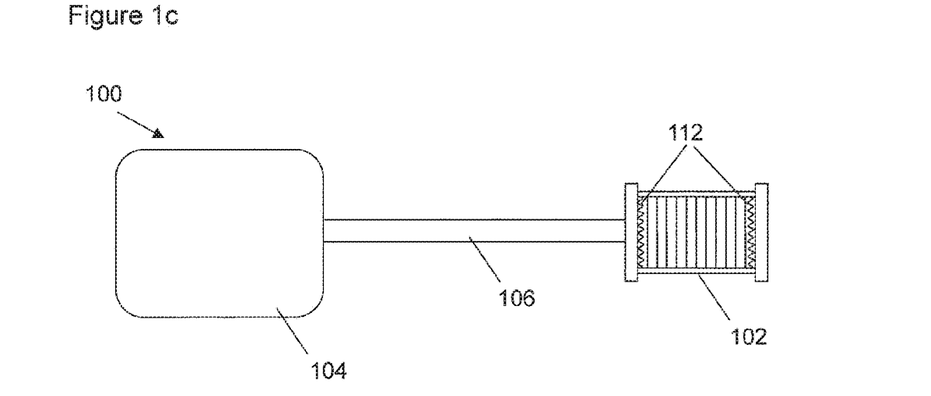

FIGS. 1a-1c illustrate an example embodiment of a fuel cell system 100 comprising an antimicrobial patterned surface 108, 110, 112. The fuel cell system 100 comprises a fuel cell stack 102, a coolant reservoir 104 and a coolant flow path 106 configured to supply coolant from the coolant reservoir 104 to the fuel cell stack 102.

In FIG. 1a, the coolant reservoir 104 has inner walls having an antimicrobial patterned surface 108. This embodiment may be effective in inhibiting bacterial growth at the coolant source, before the coolant travels from the coolant reservoir through the coolant flow path 106 to the fuel cell stack 102. In this example all inner walls of the coolant reservoir 104 comprise the patterned antimicrobial surface 108. In other examples only some inner walls may comprise the patterned antimicrobial surface 108.

In FIG. 1b, the coolant flow path 106 has inner walls comprising an antimicrobial patterned surface 110. It may be that a part of the coolant flow path 106 comprises the antimicrobial patterned surface 110 and another part does not.

In FIG. 1c, the fuel cell stack 102 has inner surfaces comprising the antimicrobial patterned surface 112. It may be that some inner surfaces of the fuel cell stack 102 comprise the antimicrobial patterned surface 112 (such as those exposed to coolant) while others do not. More than one component of the fuel cell system 100 may comprise an antimicrobial patterned surface (for example, both in the coolant reservoir 104 and in the coolant flow path 106).

In some examples the antimicrobial patterned surface 108, 110, 112 may be applied to a component by coating the component 102, 104, 106 with a film having the patterned antimicrobial surface. In some examples the patterned antimicrobial surface 108, 110, 112 may be formed on the surface of a component 102, 104, 106 by machining the surface to have a suitable antimicrobial pattern.

Figure 2A:
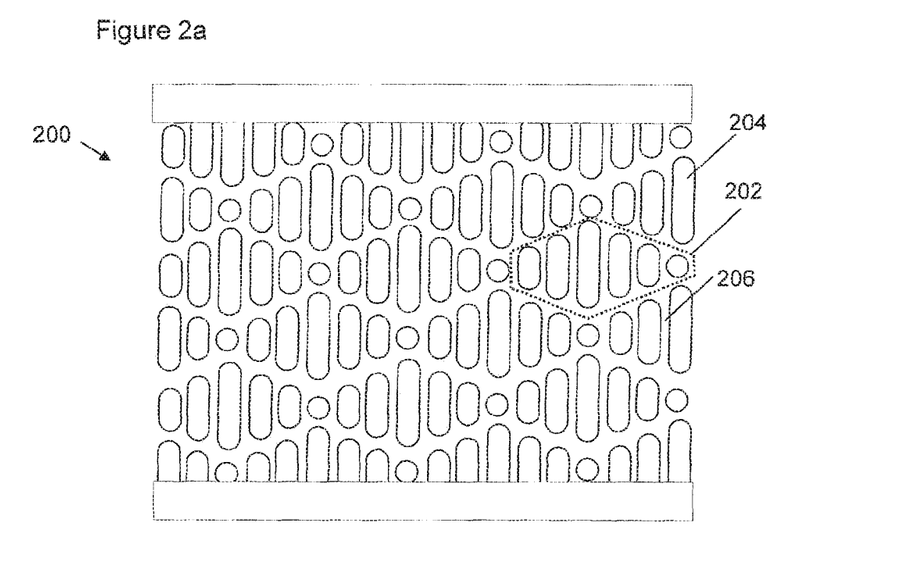
FIGS. 2a-2b show schematic views of an exemplary antimicrobial patterned surface.
Figure 2B:
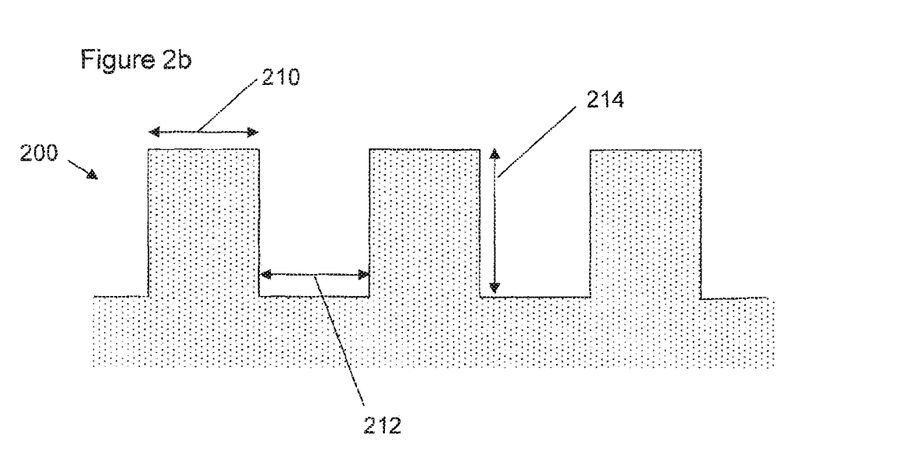

FIGS. 2a-2b show schematic views of an exemplary antimicrobial patterned surface. In FIG. 2a, a top-down view of an exemplary surface 200 is shown. In FIG. 2b, a cross-sectional view through three ridges 204 of the exemplary surface of FIG. 2a is shown. The surface 200 may be considered to comprise a plurality of microscale corrugations 204 raised up from a base level 206 of the surface in a cellular repeating pattern. The microscale corrugations may be non-continuous, such as a series of discontinuous ridges, bumps or projections. The surface therefore may have a corrugated appearance with rows/regions of discontinuous corrugations.

FIG. 2a shows a patterned antimicrobial surface comprising a cellular repeating pattern with a hexagonal/diamond shaped unit cell 202. Each unit cell 202 comprises six parallel ridges 204 of varying lengths which are raised in relation to the space between the ridges 206. This pattern may be considered to mimic the structure of a shark's skin, with each unit cell 202 representing a sharkskin scale, and each unit cell 202 comprising ridges 204 similar to those of a sharkskin scale.

While the surface shown in FIG. 2a shows a cellular repeating pattern of discontinuous corrugated ridges 204, other surface patterns may be used which satisfy the criteria for inhibiting bacterial growth and adhesion. For example, a surface may comprise structures which, from a top-down view of the surface, are substantially round, oval, triangular, square, rectangular, pentagonal, and/or hexagonal. As another example, an antimicrobial patterned surface may comprise microscale structures within bands running across the surface. The microscale structures may be raised up from the base level of the surface, and/or may be sunken/depressed into the base level of the surface. The patterned antimicrobial surface may comprise one or more different shapes, structure heights, structure separations, and/or structure widths.

FIG. 2b illustrates different dimensions which may be defined for such a patterned antimicrobial surface. In this example, the ridges 204 and the spacing between ridges 206 have microscale dimensions. For example, the ridges 204 may each have a width 210 between 2 and 25 microns. The microscale ridges may be separated across their width by a spacing 212 of between 2 and 25 microns. The microscale ridges 204 may each have a depth 214 of between 2 and 20 microns. In some examples the width 210 may be more than 25 microns, the spacing 212 may be more than 25 microns, and/or the depth 214 may be more than 20 microns. In some examples the width 210 may be less than 2 microns, the spacing 212 may be less than 2 microns, and/or the depth 214 may be less than 2 microns. The dimensions 210, 212, 214 may be tuned depending on the size of the organisms which are to be inhibited from developing on the surface 200.

The antimicrobial patterned surface may have an average roughness factor of between 2 and 30, determined as the ratio of the actual surface area to the geometric surface area. For example, a perfectly smooth 1 $cm^2$ area has both an actual and geometric surface area of 1 $cm^2$ and thus a roughness factor of 1. As the surface becomes rougher, due to corrugations and surface patterning for example, then the roughness factor increases. For example if the 1 $cm^2$ surface is patterned such that the total exposed surface has an area of 2 $cm^2$, then the roughness factor would be 2.

The surface roughness maybe quantified using other metrics. For example, the arithmetic mean roughness factor $R_a$ may be determined for a surface and may lie in a particular range conducive for inhibiting microbial growth. The arithmetic mean roughness factor $R_a$ is the arithmetic mean of absolute departures of a cross-sectional roughness profile from a mean line. Thus, if a cross section is taken through the patterned surface, the arithmetic mean of the differences from a mean line of this cross section would give the arithmetic mean roughness factor $R_a$. Of course, other ways of measuring roughness may be used and the roughness of the patterned antimicrobial surface determined using one or more of these methods may lie in a particular range conducive to inhibiting microbial growth.

While FIG. 2b shows the ridge height 214, width 210 and separation 212 to be the same across the surface 200, in other examples one or more of these dimensions may vary across the surface 200. In an example where structures are depressed into the surface rather than raised up from the base level of the surface, the height of the structure may be considered to be the distance from the base level of the surface to the bottom of the depression/trough formed by the structure.

The antimicrobial patterned surface may be a Tactivex® surface with Sharklet® technology which inhibits bacterial survival and transfer through a surface micro-pattern. Other surfaces could be used.

In some examples, the antimicrobial patterned surface is chemically inert. Use of such a non-chemical system for coolant purification may be advantageous as the surface may not need to be "refreshed" as a chemically active component may need to be when its chemical activity has been depleted due to coolant cleaning/purification. The patterned surface may be able to provide antimicrobial properties for a longer time than a chemically active antimicrobial component.

The antimicrobial patterned surface may be considered to be a passive coolant purification component, since it inhibits the growth and development of microbes on the surface rather than attacking already-present microbes. Inhibiting microbial growth may be advantageous compared with killing existing microbes, since there is a reduced burden to remove biological debris from dead microbes if the microbes are inhibited from multiplying on the fuel cell system due to the patterned antimicrobial surface.

In other examples, the antimicrobial patterned surface may be chemically active. This may be advantageous to provide coolant cleaning through both chemically activity and non-chemical surface properties (that is, due to the physical structure of the surface relief). Thus microbes may be inhibited from growing/multiplying due to the patterning of the antimicrobial surface, and microbes which are present in the coolant may be killed by the chemically active component of the surface.

Figure 3A:
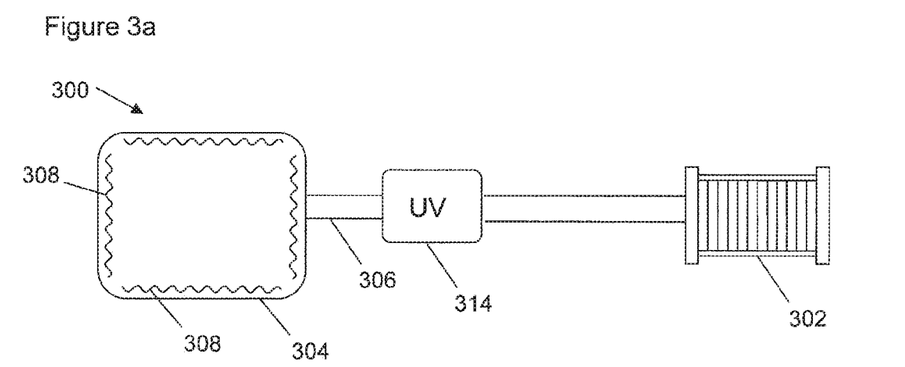
FIGS. 3a-3c show schematic views of fuel cell systems comprising an antimicrobial patterned surface, an ultra violet light source and/or a deionisation apparatus.
Figure 3B:
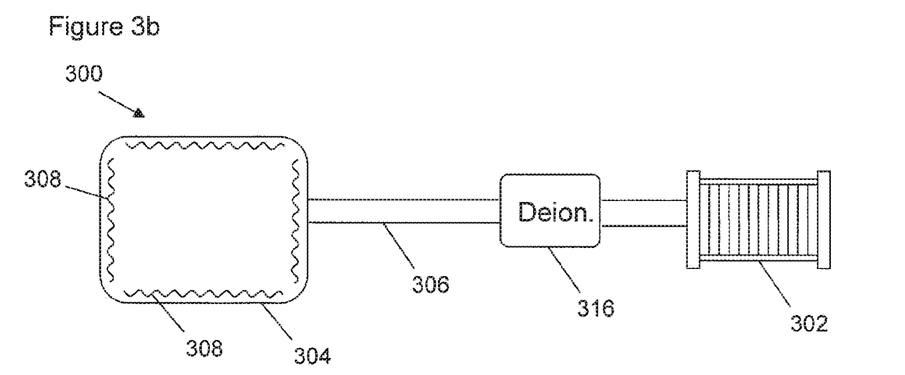
Figure 3C:
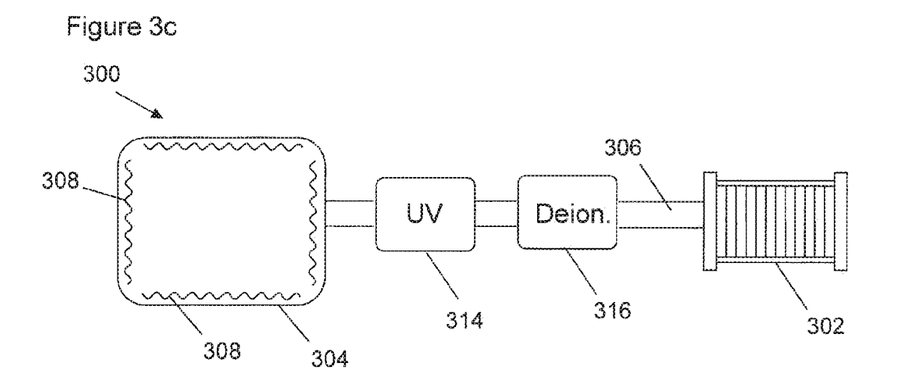

FIGS. 3a-3c illustrate an example embodiment of a fuel cell system 300 comprising a fuel cell stack 302, a coolant reservoir 304 and a coolant flow path 306 configured to supply coolant from the coolant reservoir 304 to the fuel cell stack 302. The coolant reservoir 304 in these examples comprises the antimicrobial patterned surface 308.

In FIG. 3a, a UV light source 314 is located in the coolant flow path 306 upstream of the fuel cell stack 302. The UV light source may be, for example, a UV lamp or a series of one or more UV light emitting diodes (LEDs). Coolant will pass the UV light source 314 which is configured to break down microbes in the coolant. The combination of the UV light source 314 and the patterned antimicrobial surface 308 may be considered to provide a synergistic effect in purifying the coolant. The patterned antimicrobial surface 308 acts to prevent the growth and aggregation of bacteria/microbes in the coolant, in particular on the surface in aggregations/biolayers where the UV light may not reach. The UV light source 314 may be able to break down microbes in the coolant more effectively if there are fewer, more disperse microbes in the coolant (due to the patterned antimicrobial surface 308). Thus the effect of the patterned antimicrobial surface 308 may cause the UV light source 314 to be more effective at breaking down microbes in the coolant by inhibiting the formation of microbial aggregations.

In FIG. 3b, a deionisation apparatus 316, such as a deionisation column, is located in the coolant flow path 306 upstream of the fuel cell stack 302. In other such examples, any deionisation apparatus configured for ion exchange with the coolant fluid may be used. The deionisation apparatus 316 acts to remove inorganic and organic ions from the coolant which may damage the fuel cell stack 302 and degrade performance of the fuel cell stack 302 (for example by contributing to corrosion of the fuel cell plates or by being deposited on the fuel cell plates).

In FIG. 3c, the fuel cell system 300 comprises both a UV light source 314 and a deionisation apparatus 316 upstream of the fuel cell stack 302. The deionisation apparatus 316 is located upstream of the fuel cell stack 302 and downstream of the UV light source 314. Both active and passive coolant purification components are present in the fuel cell system of FIG. 3c. The patterned antimicrobial surface 308 may be considered a passive component as it does not expend energy in disrupting microbial growth. The UV light source 314 may be considered an active component because it expends energy to actively attack microbes and remove contaminant species.

Figure 4A:
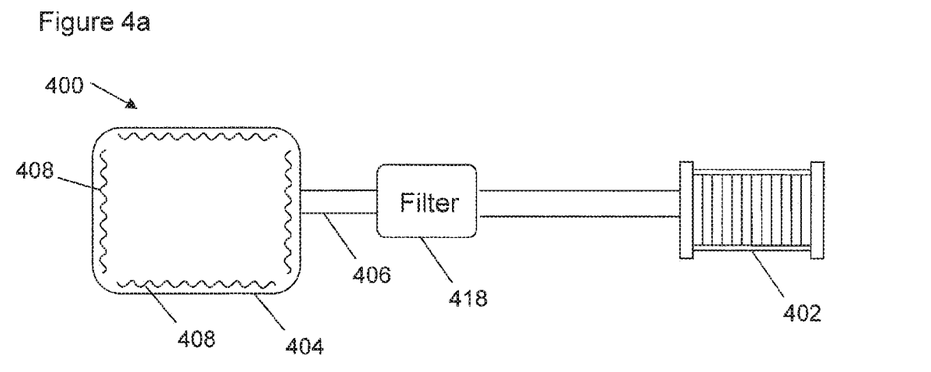
FIGS. 4a-4c show schematic views of fuel cell systems comprising an antimicrobial patterned surface, a filter and/or a pump.
Figure 4B:
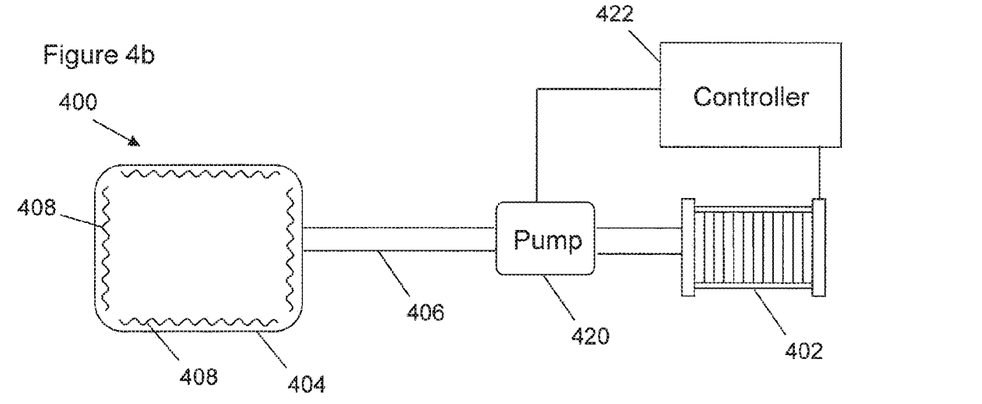
Figure 4C:
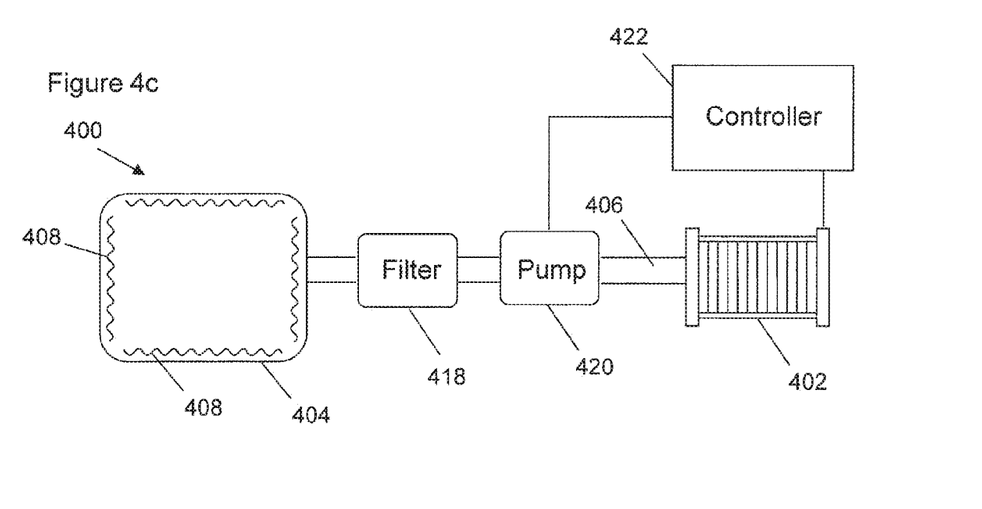

FIGS. 4a-4c illustrate an example embodiment of a fuel cell system 400 comprising a fuel cell stack 402, a coolant reservoir 404 and a coolant flow path 406 configured to supply coolant from the coolant reservoir 404 to the fuel cell stack 402. The coolant reservoir 404 in this example comprises the antimicrobial patterned surface 408.

In FIG. 4a, a filter 418 is located in the coolant flow path 406 upstream of the fuel cell stack. Coolant will pass through the filter 418 which will act to remove microbes and bacterial debris from the coolant in the coolant flow path 406.

In FIG. 4b, a pump 420 is located in the coolant flow path 406 upstream of the fuel cell stack. The pump 420 is coupled to a controller 422. The controller in this example is coupled to the fuel cell stack 402, for example to receive a fuel cell stack operating parameter such as the stack voltage. Coolant will be pumped from the coolant reservoir 404 to the fuel cell stack 402 by the pump 420. In this example the controller 422 is configured to control the rate of coolant flow to the fuel cell stack 420 based on a stack operating parameter. In other examples the controller 422 may be configured to control the rate of coolant flow to the fuel cell stack 420 based on a different parameter, for example as discussed in relation to FIGS. 5a and 5b.

In FIG. 4c, the fuel cell system 400 comprises both a filter 418 and a pump 420 controlled by the controller 422. The pump 420 is located upstream of the fuel cell stack 402 and downstream of the filter 418 in this example.

Figure 5A:
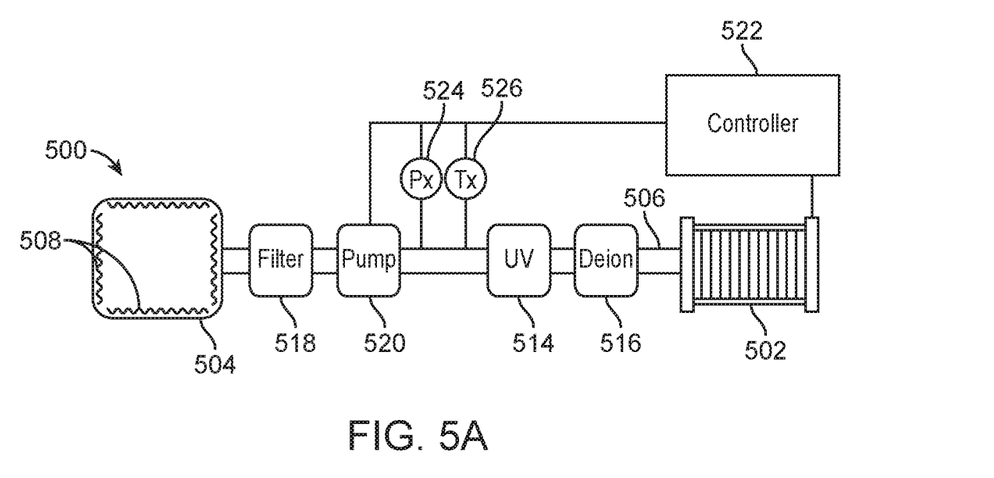
FIGS. 5a-5b show schematic views of fuel cell systems comprising an antimicrobial patterned surface and other components.
Figure 5B:
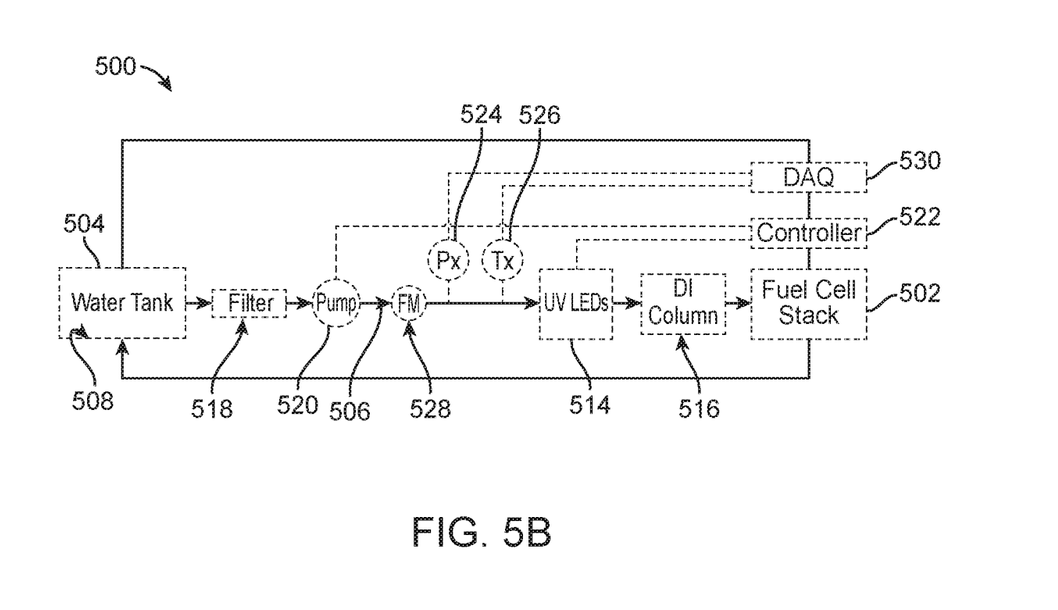

FIGS. 5a-5b illustrate an example embodiment of a fuel cell system 500 comprising a fuel cell stack 502, a coolant reservoir 504 and a coolant flow path 506 configured to supply coolant from the coolant reservoir 504 to the fuel cell stack 502. The coolant reservoir 504 in this example comprises the antimicrobial patterned surface 508.

FIG. 5a shows that, within the coolant flow path 506, a filter 518, a pump 520 coupled to a controller 522, a UV light source 514 and a deionisation apparatus 516 are located upstream of the fuel cell stack 502. These different components are discussed above. Also present in the fuel cell system 500 are a pressure meter 524 and a temperature meter 526 both coupled to the controller 522. The controller 522 is also coupled to the fuel cell stack 502 for receiving a stack operating parameter.

The pressure meter 524 is configured to determine the coolant pressure in the fuel cell system 500, and in particular of the coolant pressure in the coolant flow path 506. The controller 522 is configured to receive a pressure value from the pressure meter 524 and, based on the pressure value, control the flow of coolant in the coolant flow path 506. Thus if the coolant pressure is below a desired pressure threshold, the controller 522 can increase the pumping using the pump 520 to increase the flow of coolant to the fuel cell stack 502.

The temperature meter 526 is configured to determine the coolant temperature in the fuel cell system 500, and in particular of the coolant temperature in the coolant flow path 506. The controller 522 is configured to receive a temperature value from the temperature meter 526 and, based on the temperature value, control the flow of coolant in the coolant flow path 506. For example, a higher temperature may indicate that a higher coolant flow is required to the fuel cell stack 502 to sufficiently cool the fuel cells in the stack 502.

FIG. 5b builds upon the fuel cell system shown in FIG. 5a, and further comprises a flowmeter (FM) 528 and a data acquisition card (DAQ) 530 coupled to the controller 522. The flow meter 528 measures the flow of coolant through the coolant flow path 506. In this example the controller 522 is coupled to the pump 520 and UV light source 514 (in this example, a series of UV light emitting diodes (LEDs)). The controller 522 can thus send a signal to control the pump 520 and/or UV light source 514 based on, for example, feedback received from the stack or temperature/pressure meters or according to a predetermined operating programme. In this example the DAQ 530 is coupled to the pressure meter 524 and temperature meter 526 to receive pressure and temperature readings from the coolant flow path 506 to feed back to the controller 522. The controller 522 is shown coupled to the fuel cell stack 502 for receiving stack operating parameters. In other examples the DAQ 530 may be coupled to the fuel cell stack 502, for receiving operating parameters.

The above embodiments also exemplify an antimicrobial system for attachment to a fuel cell stack. FIG. 1a shows an antimicrobial system comprising a coolant reservoir for connecting to a fuel cell stack and FIG. 1b shows an antimicrobial system comprising a coolant flow path for connecting to a fuel cell stack. FIGS. 3a-3c, 4a-4c and 5a-5b also show an antimicrobial system comprising a coolant reservoir for connecting to a fuel cell stack.

While the examples above discuss one fuel cell stack, it will be appreciated there may be a plurality of fuel cell stacks in the fuel cell system. Further, more than one particular component may be present in the fuel cell system (for example, one UV light source may be present just downstream of the coolant reservoir and a further UV light source may be present just upstream of the fuel cell stack).

It will be appreciated that the above described embodiments may be combined in various ways within the scope of the claims. For example, a fuel cell system may comprise a UV light source for breaking down bacteria, and a filter for removing bacterial debris from the coolant. Other embodiments are intentionally within the scope of the accompanying claims.

The invention claimed is:

1. A fuel cell system comprising:
   a fuel cell stack;
   a coolant reservoir; and
   a coolant flow path configured to supply coolant from the coolant reservoir to the fuel cell stack;
   wherein one or more of the fuel cell stack, the coolant reservoir, and the coolant flow path comprises a patterned surface, wherein the patterned surface is chemically inert and without antimicrobial chemical agents;
   wherein the chemically inert patterned surface has a surface relief with:
   (a) an average roughness factor of between 2 and 30, the average roughness factor determined as a ratio of an actual surface area to a geometric surface area; and/or
   (b) microscale corrugations or ridges; and/or
   (c) a cellular relief pattern;
   the surface relief being sufficient to interfere with settlement and adhesion of a microbe on the chemically inert patterned surface, thereby rendering the chemically inert patterned surface an antimicrobial patterned surface.

2. The fuel cell system of claim 1, wherein the antimicrobial patterned surface comprises the microscale corrugations for inhibiting microbial growth.

3. The fuel cell system of claim 2, wherein the microscale corrugations each have a width of between 10 and 100 microns.

4. The fuel cell system of claim 2, wherein the microscale corrugations are separated across their width by a spacing of between 10 and 100 microns.

5. The fuel cell system of claim 2, wherein the microscale corrugations each have a depth of between 10 and 100 microns.

6. The fuel cell system of claim 1, wherein the antimicrobial patterned surface comprises the cellular relief pattern.

7. The fuel cell system of claim 1 wherein the coolant is water.

8. The fuel cell system of claim 1 comprising an ultra violet light source arranged in the coolant flow path for supplying coolant to the fuel cell stack, the UV light source positioned upstream of the fuel cell stack.

9. The fuel cell system of claim 1 comprising a deionisation apparatus arranged in the coolant flow path for supplying coolant to the fuel cell stack, the deionisation apparatus positioned upstream of the fuel cell stack.

10. The fuel cell system of claim 1 wherein a deionisation apparatus is positioned downstream from an ultra violet light source and upstream from the fuel cell stack.

11. The fuel cell system of claim 1 comprising a filter arranged in the coolant flow path for supplying coolant to the fuel cell stack, the filter positioned upstream of the fuel cell stack.

12. The fuel cell system of claim 1, wherein the fuel cell system comprises:
   a pressure meter configured to determine a coolant pressure in the coolant flow path;
   a pump positioned in the coolant flow path; and
   a controller configured to control the pump; wherein the controller is configured to receive a pressure value from the pressure meter and, based on the pressure value, control the coolant in the coolant flow path using the pump.

13. The fuel cell system of claim 1, wherein the fuel cell system comprises:
   a temperature meter configured to determine a coolant temperature in the coolant flow path;
   a pump positioned in the coolant flow path; and
   a controller configured to control the pump;
   wherein the controller is configured to receive a temperature value from the temperature meter and, based on the temperature value, control the flow of coolant in the coolant flow path using the pump.

14. The fuel cell system of claim 1 further comprising:
   a pump positioned in the coolant flow path; and
   a controller configured to control the pump.

* * * * *